(No Model.)

R. J. SAXTON.
TRUCK.

No. 349,368. Patented Sept. 21, 1886.

Witnesses:
W. J. Bellamy
W. G. Mear

Inventor,
Richard J. Saxton
By W. F. Hapgood.
Attorney.

UNITED STATES PATENT OFFICE.

RICHARD J. SAXTON, OF BROOKLYN, ASSIGNOR OF ONE-HALF TO THOMAS DAY, OF NEW YORK, N. Y.

TRUCK.

SPECIFICATION forming part of Letters Patent No. 349,368, dated September 21, 1886.

Application filed April 17, 1886. Serial No. 199,160. (No model.)

*To all whom it may concern:*

Be it known that I, RICHARD J. SAXTON, a citizen of the United States, residing at Brooklyn, in the county of Kings and State of New York, have invented a new and useful Improvement in Trucks, of which the following is a specification.

The description of truck to which my invention relates is that which has three wheels, and is used for conveying goods from place to place about warehouses and stores. In practical use much trouble is experienced with these trucks on account of the frequent breaking and pulling off of the caster-wheel at the rear end of the truck; and the object of my invention is to construct a strong and at the same time light truck, which shall have the caster-wheel so constructed and attached as to obviate the difficulties above referred to. I accomplish this by the construction illustrated in the accompanying drawings, where—

Figure 1:
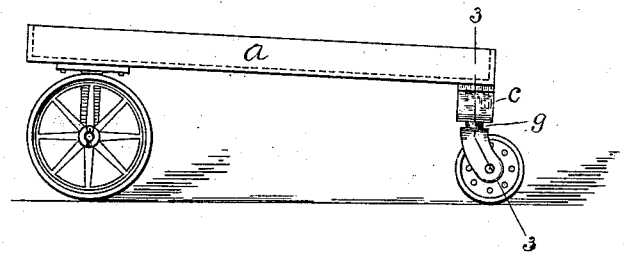
Figure 2:
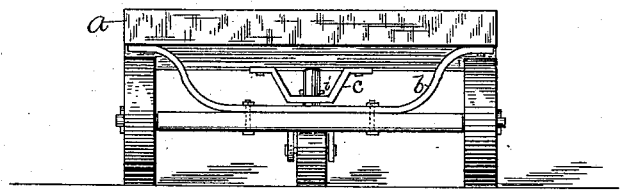
Figure 3:
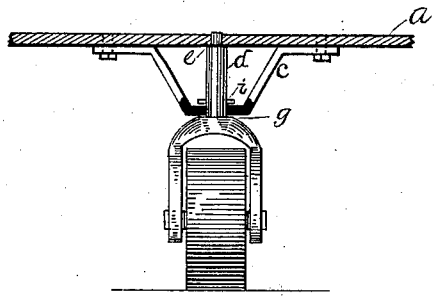

Figure 1 is a side elevation of the truck. Fig. 2 is an end elevation, and Fig. 3 is a section on the line 3 3 of Fig. 1.

The frame $a$ of my improved truck is constructed of a single bar of angle-iron, which is bent to a rectangular form and the two ends welded together. The front wheels are connected to the truck-frame by means of the bow-shaped iron bolster $b$, of bar-iron, which raises the frame of the truck sufficiently high above the axle to allow of the wheels being placed under the frame $a$. At the rear end of the frame $a$ is an iron bracket, $c$, strongly bolted or riveted to the frame. The spindle $d$ of the caster-wheel passes through this bracket, and its upper end is stepped in a hole in the frame $a$. The bracket and the frame $a$ form two bearings for the spindle, and a shoulder at $g$ upon the spindle, bearing against the lower side of the bracket, receives a portion of the weight of the truck, as does also the shoulder at $e$, the step for the end of the spindle. Thus the spindle of the caster-wheel has two bearings for both the perpendicular and the lateral strains to which it is subject, both of which are component parts of the main frame of the truck, and consequently the caster-wheel is not liable to be broken from the truck.

To prevent the spindle $d$ from dropping out of its bearings, a pin, $i$, is inserted in it close to the bracket $c$, where it is not liable to come in contact with any object and be displaced, and does not interfere with the free revolution of the spindle.

What I claim, and desire to secure by Letters Patent is—

1. In a three-wheel truck, the combination of an angle-iron frame and the bracket $c$ with a caster-wheel whose spindle has bearings both perpendicular and horizontal in both the main frame and the bracket, substantially as described.

2. In a three-wheel truck, the combination of the frame $a$ and bracket $c$ with the spindle $d$, having bearings and shoulders at $e$ and $g$, and the pin $i$, substantially as and for the purpose set forth.

RICHARD J. SAXTON.

Witnesses:
 EDGAR J. PHILLIPS,
 WM. S. BELLOWS.